(12) United States Patent
Bättig et al.

(10) Patent No.: US 7,229,061 B2
(45) Date of Patent: Jun. 12, 2007

(54) DEVICE FOR FASTENING A TURBOCHARGER

(75) Inventors: Josef Bättig, Egliswil (CH); Jean-Yves Werro, Rieden (CH)

(73) Assignee: ABB Turbo Systems AG, Baden (CH)

( * ) Notice: Subject to any disclaimer, the term of this patent is extended or adjusted under 35 U.S.C. 154(b) by 0 days.

(21) Appl. No.: 10/332,714

(22) PCT Filed: Jul. 17, 2001

(86) PCT No.: PCT/CH01/00443

§ 371 (c)(1),
(2), (4) Date: Jan. 13, 2003

(87) PCT Pub. No.: WO02/08575

PCT Pub. Date: Jan. 31, 2002

(65) Prior Publication Data

US 2003/0106982 A1    Jun. 12, 2003

(30) Foreign Application Priority Data

Jul. 26, 2000    (EP) .................................. 00810663

(51) Int. Cl.
*F16M 3/00* (2006.01)
*F03D 11/00* (2006.01)

(52) U.S. Cl. ............... 248/677; 248/678; 411/353; 415/136; 415/213.1

(58) Field of Classification Search ........... 248/672, 248/674, 676, 677, 678, 680, 635; 415/182.1, 415/184, 134, 213.1, 136, 204, 205; 411/546, 411/383, 384, 353, 107; 60/602, 605.3
See application file for complete search history.

(56) References Cited

U.S. PATENT DOCUMENTS

| | | | | |
|---|---|---|---|---|
| 1,511,336 A | * | 10/1924 | Hoey ......................... 248/656 |
| 2,275,315 A | * | 3/1942 | Ray ........................ 411/371.2 |
| 2,765,997 A | * | 10/1956 | Motts ......................... 248/657 |
| 3,173,241 A | | 3/1965 | Birmann |
| 3,332,611 A | * | 7/1967 | Bednarski et al. .......... 415/206 |
| 3,408,046 A | * | 10/1968 | Woollenweber ............. 415/184 |
| 3,614,259 A | * | 10/1971 | Neff ........................... 415/205 |
| 3,851,607 A | | 12/1974 | August Jr. et al. |
| 3,891,345 A | * | 6/1975 | Doolin ....................... 415/232 |
| 4,117,997 A | * | 10/1978 | Gitzendanner .............. 248/646 |

(Continued)

FOREIGN PATENT DOCUMENTS

DE    699825    12/1940

(Continued)

*Primary Examiner*—Carl D. Friedman
*Assistant Examiner*—Tan Le
(74) *Attorney, Agent, or Firm*—Buchanan Ingersoll & Rooney PC

(57) ABSTRACT

A device for fastening a turbocharger to a base, with a fastening foot (12) which is integrally formed in one piece on a gas outlet casing (10) of the turbocharger and which has long holes (16) spaced from one another and preferably arranged in a star-shaped manner in relation to one another. In order to fasten the turbocharger, sliding shoes (26) are capable of being inserted into the long holes (16) and have continuous orifices, through which can be led fastening elements (30, 30') capable of being fixed in the base.

12 Claims, 4 Drawing Sheets

U.S. PATENT DOCUMENTS

| | | | | |
|---|---|---|---|---|
| 4,193,434 A | * | 3/1980 | Wagner | 411/154 |
| 4,401,287 A | * | 8/1983 | Moeser | 248/425 |
| 4,435,112 A | * | 3/1984 | Becker | 411/368 |
| 4,666,412 A | * | 5/1987 | Rawlings | 440/111 |
| 4,732,519 A | * | 3/1988 | Wagner | 411/337 |
| 4,832,306 A | * | 5/1989 | Bossack | 248/674 |
| 4,863,329 A | * | 9/1989 | Wilson | 411/339 |
| 4,945,272 A | * | 7/1990 | Ochi et al. | 310/91 |
| 5,244,325 A | * | 9/1993 | Knohl | 411/353 |
| 5,403,150 A | * | 4/1995 | McEachern et al. | 415/177 |
| 5,487,523 A | * | 1/1996 | Ingram et al. | 248/551 |
| 5,492,301 A | * | 2/1996 | Hauser | 248/516 |
| 5,524,860 A | * | 6/1996 | Ives | 248/674 |
| 5,782,451 A | * | 7/1998 | Carnahan et al. | 248/425 |
| 5,975,480 A | * | 11/1999 | Schaefer et al. | 248/678 |
| 6,099,190 A | * | 8/2000 | Honobe et al. | 403/13 |
| 6,371,238 B1 | * | 4/2002 | Svihla | 180/296 |
| 6,394,537 B1 | * | 5/2002 | DeRees | 296/191 |
| 6,533,238 B2 | * | 3/2003 | Barnes et al. | 248/680 |
| 6,688,103 B2 | * | 2/2004 | Pleuss et al. | 60/605.1 |
| 6,709,235 B2 | * | 3/2004 | Hosny | 415/205 |
| 6,809,446 B2 | * | 10/2004 | Yamamoto et al. | 310/89 |
| 7,008,182 B2 | * | 3/2006 | Kopp et al. | 415/136 |
| 2001/0048062 A1 | * | 12/2001 | Murao et al. | 248/680 |
| 2003/0106982 A1 | * | 6/2003 | Battig et al. | 248/678 |

FOREIGN PATENT DOCUMENTS

| | | | |
|---|---|---|---|
| DE | 2210038 | | 9/1972 |
| DE | 3606944 A1 | * | 9/1987 |
| DE | 3641478 A1 | | 6/1988 |
| DE | 4432073 A1 | | 3/1996 |
| DE | 10022052 A1 | * | 3/2001 |
| EP | 0785378 A1 | | 7/1997 |
| EP | 1273767 A1 | * | 1/2003 |
| EP | 1293681 A1 | * | 3/2003 |
| EP | 1331365 A1 | * | 7/2003 |
| FR | 2307126 | | 11/1976 |
| GB | 2292976 A | * | 3/1996 |
| JP | 03160147 A | * | 7/1991 |

\* cited by examiner

DEVICE FOR FASTENING A TURBOCHARGER

FIELD OF THE INVENTION

The invention relates to a device for fastening turbochargers to a base according to features described herein.

BACKGROUND OF THE INVENTION

There is a series of widely differing possibilities for fastening turbochargers to a base. Since the turbochargers used at the present time mostly have uncooled casings, with turbochargers being fastened to a mostly relatively cool base, there is the problem of different thermal expansions between turbocharger and base which lead to stresses in the fastening device. In order to solve this problem, as a rule, separate fastening feet are introduced between turbocharger and base which, by virtue of a special configuration, can absorb the different expansions. Moreover, these fastening feet also often allow a spatially variable orientation of at least parts of the casing of the turbocharger. Separate fastening feet of the type mentioned are known, for example, from DE-A-4432073 and DE-A13641478.

Turbochargers for special applications usually have only one specific position for the gas outlet casing, for example vertically upward in locomotives. In such cases, a fastening foot connected in one piece to the gas outlet casing is much more cost-effective in terms of production and assembly than a separate fastening foot. As regards cooled gas outlet casings, in which virtually no thermal expansion differences occur between base and casing, the integrally formed fastening foot does not present any problems. One example of such a fastening foot integrally formed on a cooled gas outlet casing may be gathered from the article "New turbochargers for medium and larger engines", Diesel and Gas Turbine Progress, pages 36f, December 1968. Since the production and operation of turbochargers with a cooled gas outlet casing are more complicated and more costly, as compared with turbochargers with an uncooled gas outlet casing, there is a search for a possibility of utilizing both the advantages of turbochargers with an integrally formed fastening foot and the advantages of turbochargers with an uncooled gas outlet casing.

SUMMARY OF THE INVENTION

The object is, therefore, to provide a fastening device for turbochargers, which has a fastening foot integrally formed in one piece in a gas outlet casing and which can absorb or compensate different thermal expansions of base and gas outlet casing.

This object is achieved by means of a fastening device having features described herein.

A fastening foot integrally formed in one piece on a gas outlet casing has, spaced from one another, long holes, the longitudinal axes of which meet in a star-shaped manner at a center. Sliding shoes are capable of being inserted into the long holes and receive in their continuous orifices fastening elements, such as, for example, screws. By means of the screws, the fastening foot integrally formed in one piece from the gas outlet casing of the turbocharger, and therefore the turbocharger, are fastened releasably to the base. When the internal combustion engine connected to the turbocharger is started, the gas outlet casing and the integrally formed fastening foot heat up in relation to the base. The expansion of the material heating up may amount, in this case, to several millimeters. Instead, then, of subjecting the screws to bending load, that is the case in a normal screw connection between the fastening foot and base, the expanding material of the fastening foot moves, as it were under the sliding shoes holding the screws, on the base. The screws remain guided in a stress-free manner in the sliding shoes, while a relative movement of the sliding shoe in a long hole takes place. Even after several thermal cycles, therefore, no material fatigue occurs and there is no safety risk due to the possible failure of the fastening.

The star-shaped arrangement of the longitudinal axes of the long holes allows an optimum relative movement. The common center of the longitudinal axes of the long holes is advantageously located, in terms of firmness and stability, below an axis of the turbocharger. As regards materials which are known to expand sharply in only one direction under the influence of temperature, it may, of course, be advantageous to arrange the long holes in such a way that the longitudinal axes of not all the long holes meet at a common center or to arrange them in a different way from the shape of a star.

If the long holes are open toward the periphery of the fastening foot, the relative movement of the sliding shoe in the long hole is limited to a lesser extent and even unusually pronounced expansions are absorbed by the fastening device, without the screws being subjected to a bending stress. Moreover, the machining of the fastening foot is simpler and the sliding shoes can thus be mounted more easily.

The number n of long holes is advantageously around $n \geq 3$. This has a beneficial effect on firmness. If there are 4 long holes, it is highly advantageous to orient the star-shaped longitudinal axes of the long holes at rightangles to one another. This allows favorable relative movements and a high degree of firmness.

The configuration of the sliding shoes having T-shaped cross section, a foot and two arms best meets the requirements of the sliding shoe. The foot of the T-shaped cross section fills the width of the long hole with play. The length of said foot is advantageously greater than its foot width for the purpose of better guidance in the long hole. The arms of the T-shaped sliding shoe project beyond edges of the long hole which are located on that side of the fastening foot which faces away from the base, this having a beneficial effect on the guidance of the sliding shoe in the long hole, but at the same time also ensuring a very good transmission of the clamping force of the fastening element to the fastening foot and the base. If, for example, a screw or a bolt with a large head is used as fastening element, the arms of the T-shaped cross section also act in the same way as a washer and, during relative movement, prevent the screw head and fastening foot from sliding one on the other so as to cause wear.

Where closed long holes are concerned, the length of the sliding-shoe foot must understandably be smaller than the length of the long hole, so that sufficient space remains for the relative movement of the sliding shoe in the long hole. As regards long holes which are open toward the periphery of the sliding shoe, it may be beneficial, for better guidance of the sliding shoe, if the sliding shoe is approximately as long as or even longer than the long hole.

The foot height of the sliding-shoe foot should correspond approximately to the hole height of the long hole. This assists in avoiding tilting of the sliding shoe in the long hole and allows effective guidance of the screw. The ratio of the total height of the sliding shoe to its length should be greater than 1, in order to avoid the sliding shoe tipping off and, consequently, the screw being subjected to bending loads.

The arms of the T-shaped sliding shoe are advantageously designed elastically, so that the clamping forces and the sliding forces can be effectively absorbed.

Further preferred embodiments are described herein.

BRIEF DESCRIPTION OF THE DRAWINGS

The subject of the invention is explained in more detail below with reference to preferred exemplary embodiments illustrated in the accompanying drawings in which, purely diagrammatically.

FIGS. 2a to 6a each show, in longitudinal section, a sliding shoe inserted into a long hole and having a fastening screw; and FIGS. 2b to 6b each show, in cross section, a sliding shoe inserted into a long hole and having a fastening screw.

Figure 1A:
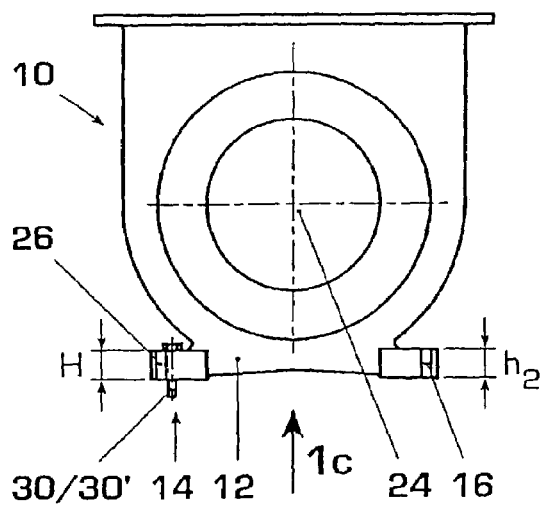
FIGS. 1a to 1e show various views of a gas outlet casing of a turbocharger with a fastening foot integrally formed in one piece and corresponding to the fastening device according to the invention.

The reference symbols used in the drawings and the significance of these symbols are listed in compilation in the list of reference symbols. Basically, in the figures, identical parts are given the same reference symbols. The embodiments described are examples of the subject of the invention and do not have any restrictive effect.

DETAILED DESCRIPTION OF THE INVENTION

Figure 1B:
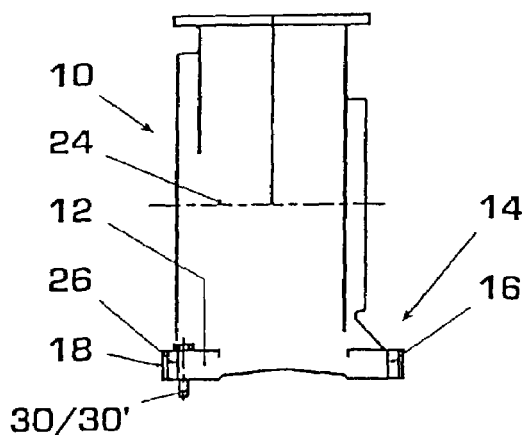
Figure 1C:
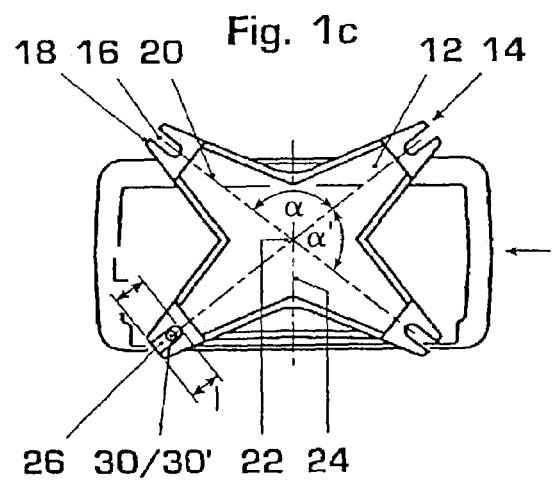
Figure 1D:
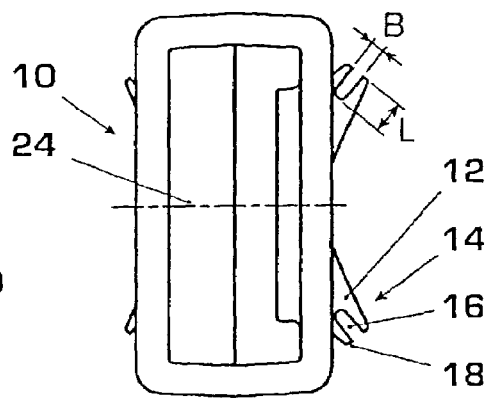
Figure 1E:
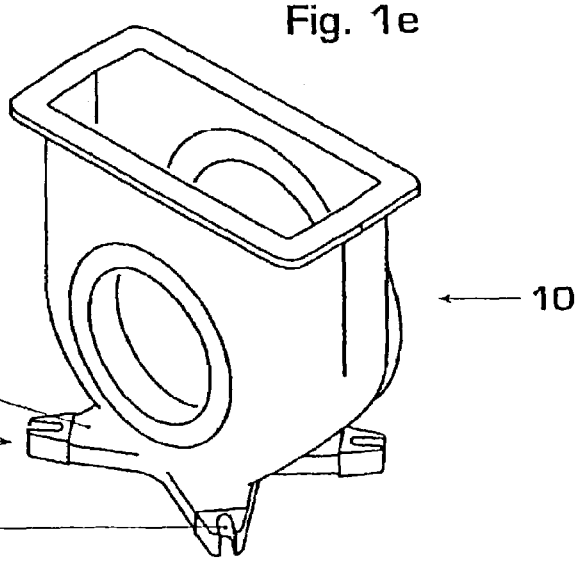

FIGS. 1a to 1e show a gas outlet casing 10 of a turbocharger, with a fastening foot 12, integrally formed in one piece, corresponding to the fastening device 14 according to the invention. In the example shown, the fastening foot 12 has four long holes 16 which are open towards the periphery 18 of the fastening foot 12. The long holes 16 are oriented with their longitudinal axes 20 in a star-shaped manner in relation to one another. The longitudinal axes 20 have a common center 22 which is located below an axis 24 of the turbocharger (cf. FIG. 1c). The size of the fastening foot 12, the number n of long holes 16 and the angle $\alpha, \alpha'$ between the longitudinal axes 20 are coordinated with the clamping force and also the weight and special configuration of the turbocharger. Thus, here, the angle $\alpha$ or $\alpha'$ between the four long holes differs from the generally highly advantageous angle of 90°. The periphery 18 of the fastening foot and therefore, in this example, also the position of the long holes 16 in relation to the gas outlet casing 10 are selected such that the long holes 16 are easily accessible for mounting and demounting the turbocharger. FIGS. 1a to 1c show by way of example one of the long holes 16 with a sliding shoe 26 and with a screw 30 inserted into the orifice 28 provided for this purpose in the sliding shoe 26. The dimensions of the long holes 16 and of the sliding shoes 26 are coordinated with the clamping length and also with the weight and configuration of the turbocharger. As is evident from FIG. 1c, in this example, the length l of the sliding shoe corresponds approximately to the length L of the long hole.

The sliding shoes are manufactured from tempering steel, are surface-hardened or are provided with a wear-resistant coating, such as AFC or the like.

FIGS. 2a to 6a illustrate, in longitudinal section, and FIGS. 2b to 6b illustrate, in cross section, in each case a part of the fastening device 14 according to the invention, to be precise the sliding shoe 26 with the orifice 28, into which a screw 30' is inserted as fastening element 30. As already mentioned, the use of other suitable fastening elements 30, such as, for example, bolts or the like, may also be envisaged. Moreover, FIGS. 3a and 3b illustrate a part of the base 36, on which the turbocharger is fastened via the gas outlet casing by means of the fastening device 14. Also illustrated, in the cross-sectional view designated in each case by "b", is that part of the fastening foot 12 which delimits the long hole 16 in its length L. The essentially T-shaped cross section of the sliding shoe 26 can be seen very clearly in this cross-sectional view, while the sliding shoe 26 appears as a parallelapipedic block in the longitudinal-sectional view designated in each case by "a".

Each sliding shoe 26 has a foot 32 and two arms 34, as can be seen clearly in the cross-sectional view b. The arms 32 project laterally beyond edges 17 of the long holes 16 which face away from the base 36. On their side facing away from the base 36, the arms 34 have a flat top 40 extending along the longitudinal center axis of the sliding shoe 26 and connecting the two arms 34 to one another. The flat top 40 serves as a rest for the head 41 of a fastening element 30, for a screw head 41' in the examples 2a to 6b shown. The foot width b of the foot 32 of the sliding shoe 26 is dimensioned such that the foot 32 fills the width B of the long hole 16 with play. For better guidance of the sliding shoe 26 in the long hole 16, the foot length l of the foot 32, which, as a rule, corresponds to the entire length l of the sliding shoe, is greater than its foot width b. The foot height $h_1$ corresponds essentially to the hole height H of the long hole 16. The ratio of length l to total height $h_2$ of the sliding shoe is greater than 1 ($l/h_2>1$). This avoids the sliding shoe 26 tilting in the long hole 16 and the screw 30' being subjected to bending stress. It is, of course, also conceivable for the sliding shoe to have a T-shaped design in longitudinal section, as well as in cross section, the result of this being that the length l of the sliding shoe 26 would then be greater than its foot length l'.

Figure 2A:
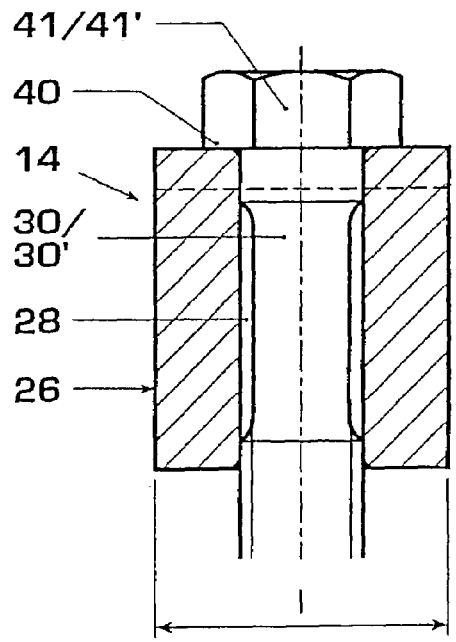
Figure 2B:
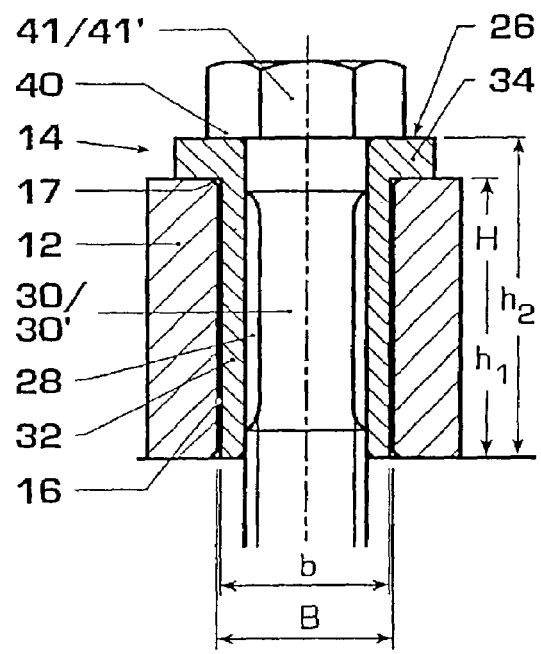

The embodiments of sliding shoes 26 which are illustrated in FIGS. 2a to 6b differ essentially in the configuration of the arms 34. FIGS. 2a and 2b illustrate a very simple sliding shoe 26 with relatively rigid arms 34 having a rectangular cross section.

Figure 3A:
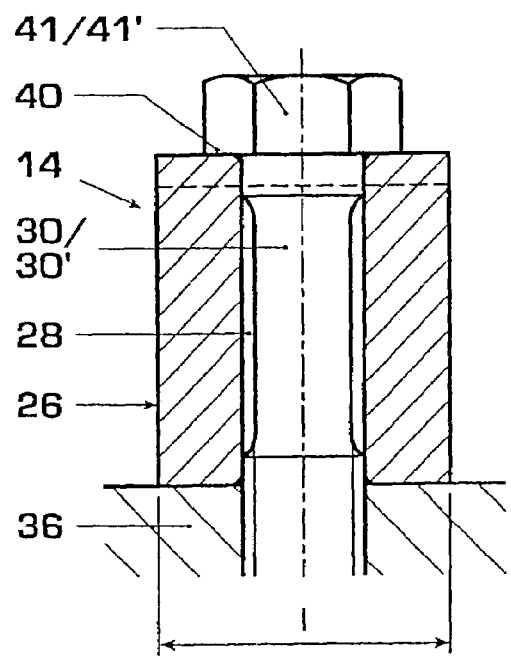
Figure 3B:
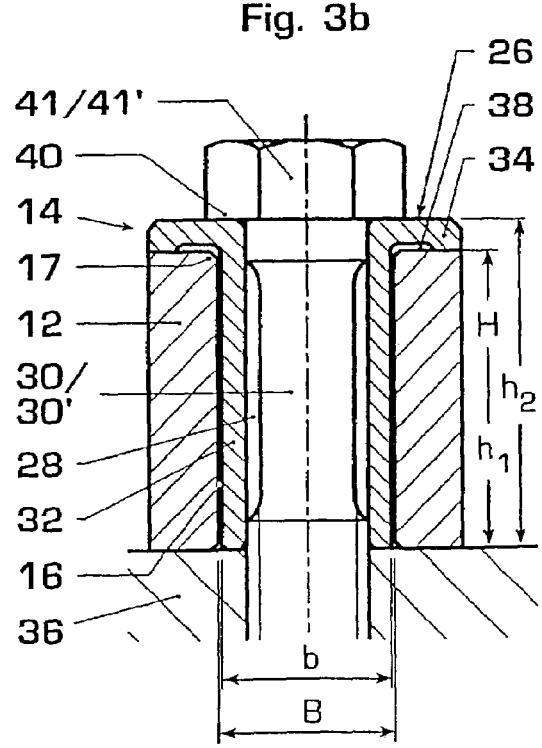

By contrast, the arms 34 of the sliding shoe illustrated in FIGS. 3a and 3b have clearances 38 on their side facing the base 36. These clearances 38 allow elastic resilience in the direction of the height $h_1$, $h_2$, with the result that the arms 34 are always arranged with slight prestress on the fastening foot 12.

Figure 4A:
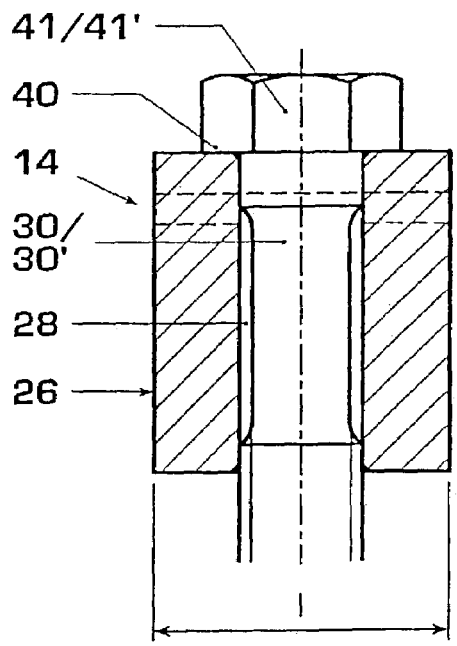
Figure 4B:
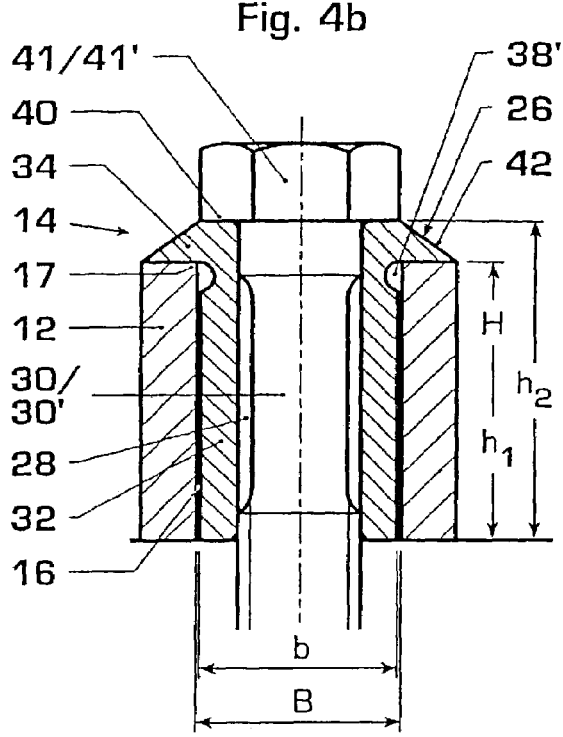

The sliding shoe 26 illustrated in FIGS. 4a and 4b has a clearance 38' in the transitional region between the arms 34 and the foot 32. Starting from the flat top 40, the arms 34, tapering outward, have a slope 42 on their side facing away from the base 36. The grove-like clearance 38' in the foot 32 and the outwardly tapering arms 34 increase the flexibility of the arms 34 and allow the arms 34 to be better optimized in terms of tension and rigidity.

Figure 5A:
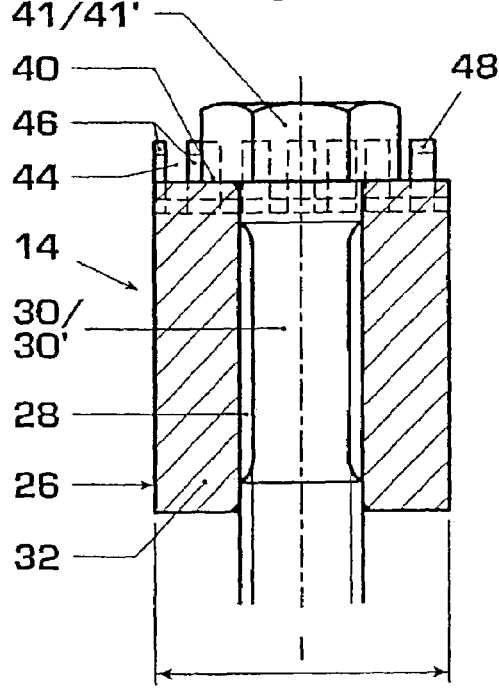
Figure 5B:
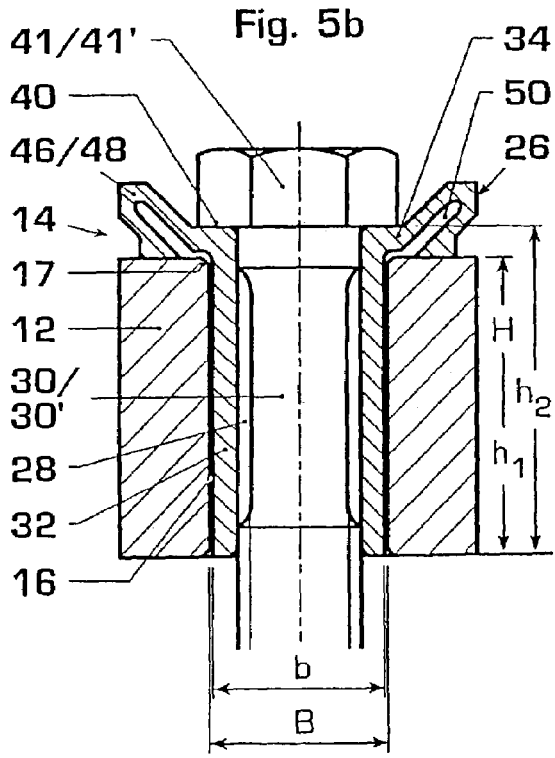

The arms 34 of the sliding shoe 26 illustrated in FIGS. 5a and 5b have recesses 44 which are spaced from one another in the longitudinal direction as far as the flat top 40 and by means of which the arms 34 are subdivided into segments 46 (cf. FIG. 5a). In this special example, the segments 46 are arranged at regular intervals from one another. The segments 46 have projections 48 projecting beyond the total height $h_2$ which have a cavity 50 for higher flexibility. The segmenting of the arms 34 and their resilient configuration allow the relative movement to be absorbed primarily by elastic deflection of the arms 34, with the result that wear is reduced.

Figure 6A:
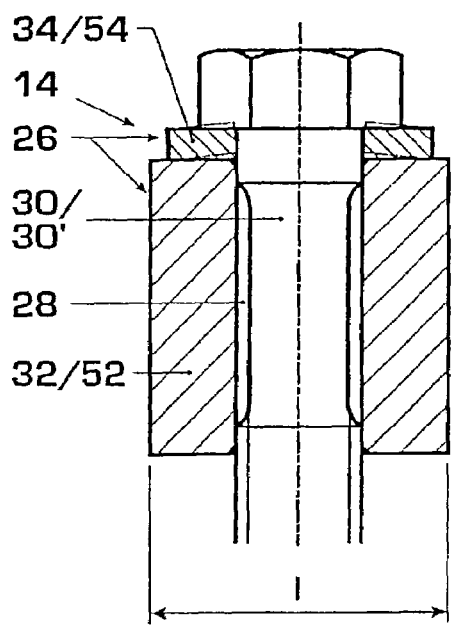
Figure 6B:
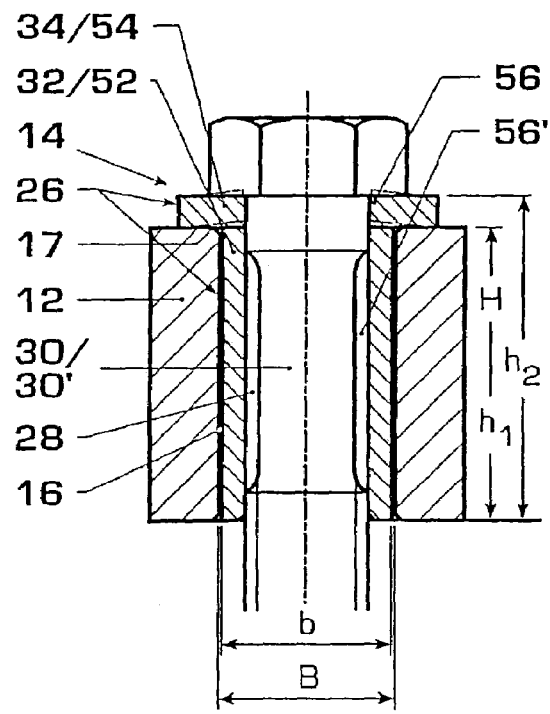

A further embodiment of the sliding shoe is illustrated in FIGS. 6a and 6b. Here, the sliding shoe comprises, as a foot 32, an essentially parallelapipedic insertion body 52 and a separate tension disk 54 which is designed elastically in the direction of the height $h_1$, $h_2$ and which forms the arms 34 and the flat top 40. Provided in the tension disk 54 and the insertion body 32 are holes 56, 56' which are capable of being brought into congruence and which together form the orifice 28 for receiving the fastening element 30, 30'. The tension disk 54 may have a round or rectangular configuration. In this example, it is manufactured, once again, from tempering steel with corresponding surface treatment. By contrast, the insertion body 52 is produced from advantageous structural steel.

It may already be gathered from the diversity of sliding shoes 26 which has been shown that further embodiments of the sliding shoes 26 which differ from those shown may be envisaged. Thus, it is conceivable to provide in the sliding shoe 26 more than one orifice 28 for receiving fastening elements 30, 30', with the result that the risk of tilting of the sliding shoe 26 can be further reduced. When screws 30' are used, a lower tightening torque is then sufficient. Nor is the number of long holes 16 in the fastening foot 12 restricted to 4. Three long holes 16 arranged in a triangle in relation to one another may also be provided, thus simplifying the mounting and demounting. However, the numbers of holes n of 5, 6 or more may also be envisaged. In coordination with the configuration of the turbocharger and its weight, a larger number n of long holes 16 may be advantageous for firmness, even though this means a higher outlay in terms of assembly. The angles $\alpha,\alpha$ between the longitudinal axes 20 and also the dimensions and configuration of the long holes 16 and sliding shoes 26 depend on the design and weight of the turbocharger and on the clamping force to be transmitted by the fastening element 30, 30'.

LIST OF REFERENCE SYMBOLS

10 Gas outlet casing
12 Fastening foot
14 Fastening device
16 Long hole
17 Edge
18 Periphery
20 Longitudinal axis
22 Common center
24 Axis of turbocharger
26 Sliding shoe
28 Continuous orifice
30 Fastening element
30' Screw
32 Foot
34 Arm
36 Base
38 Clearance
40 Flat top
41 Head
41' Screw head
42 Slope
44 Recess
46 Segment
48 Projection
50 Cavity
52 Insertion body
54 Tension disk
56,56' Hole
$\alpha,\alpha'$ Angle
b Foot width
l Length
h1 Foot height
h2 Total height
B Width of long hole
L Length of long hole
H Hole height of long hole

The invention claimed is:

1. A gas outlet casing of a turbocharger, comprising:
a fastening device for fastening the gas outlet casing to a base, the fastening device comprises a fastening foot integrally formed in one piece from the gas outlet casing, at least one sliding shoe and at least one fastening element, the fastening foot includes elongated holes which are spaced from one another and have longitudinal axes oriented in a star-shaped manner with a common center, each sliding shoe is capable of being inserted into a respective elongated hole, and each fastening element is capable of being fixed in the base and inserted through a continuous orifice in a respective sliding shoe;
wherein when the fastening foot heats up in relation to the base, expanding material of the fastening foot is movable, under each sliding shoe holding each respective fastening element, on the base.

2. The gas outlet casing of a turbocharger as claimed in claim 1, wherein the common center of the longitudinal axes of the elongated holes which are arranged in a star-shaped manner is located below an axis of the turbocharger.

3. The gas outlet casing of a turbocharger as claimed in claim 1, wherein the elongated holes are open toward the periphery of the fastening foot.

4. The gas outlet casing of a turbocharger as claimed in claim 3, wherein, when the number of elongated holes is equal to 4, an angle $\alpha$ between the longitudinal axes oriented in a star-shaped manner amounts to about $\alpha=90°$.

5. The gas outlet casing of a turbocharger as claimed in claim 1, wherein the number of elongated holes is greater than or equal to 3.

6. The gas outlet casing of a turbocharger as claimed in claim 1, wherein the ratio of length to total height of the sliding shoe is greater than or equal to 1.

7. The gas outlet casing of a turbocharger as claimed in claim 1, wherein the sliding shoe has an essentially T-shaped cross section, a foot of the T-shaped sliding shoe filling the width of the elongated hole with play, and arms of the T-shaped sliding shoe projecting beyond edges of the elongated hole which face away from the base, when the sliding shoe is inserted into the elongated hole.

8. The gas outlet casing of a turbocharger as claimed in claim 7, wherein the foot height of the foot of the T-shaped sliding shoe corresponds approximately to the hole height of the elongated hole.

9. The gas outlet casing of a turbocharger as claimed in claim 7, wherein the arms of the T-shaped sliding shoe are designed elastically at least in the direction of the height.

10. The gas outlet casing of a turbocharger as claimed in claim 7, wherein the arms of the T-shaped sliding shoe are segmented over the length of the sliding shoe by means of recesses and the individual segments are designed resiliently.

11. The gas outlet casing of a turbocharger as claimed in claim 7, wherein the foot of the sliding shoe is essentially an insertion body and the arms of the T-shaped sliding shoe are formed essentially by a separate tension disk, there being provided in the insertion body and in the tension disk holes which are capable of being brought into congruence and which together form the orifice for receiving the fastening element.

12. The gas outlet casing of a turbocharger as claimed in claim 1, wherein the sliding shoe has a plurality of continuous orifices for receiving fastening elements.

* * * * *